United States Patent
Tokunaga et al.

(10) Patent No.: US 10,666,034 B2
(45) Date of Patent: May 26, 2020

(54) BINDING STRUCTURE OF WIRE ROUTING MATERIAL

(71) Applicants: DAIWA KASEI INDUSTRY CO., LTD., Okazaki-shi, Aichi (JP); TOYOTA JIDOSHA KABUSHIKI KAISHA, Toyota-shi, Aichi-ken (JP)

(72) Inventors: Atsushi Tokunaga, Okazaki (JP); Katsuya Hirakawa, Okazaki (JP); Shinji Oshita, Toyota (JP); Itsuo Wakabayashi, Seto (JP); Kazunori Takata, Toyota (JP)

(73) Assignees: DAIWA KASEI INDUSTRY CO., LTD., Okazaki-Shi, Aichi (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 16/598,389

(22) Filed: Oct. 10, 2019

(65) Prior Publication Data

US 2020/0119536 A1 Apr. 16, 2020

(30) Foreign Application Priority Data

Oct. 16, 2018 (JP) ................................. 2018-195427

(51) Int. Cl.
*B60R 16/02* (2006.01)
*H02G 3/32* (2006.01)
(Continued)

(52) U.S. Cl.
CPC ........... *H02G 3/32* (2013.01); *B60R 16/0215* (2013.01); *F16G 11/00* (2013.01); *H01B 7/0045* (2013.01)

(58) Field of Classification Search
CPC ....... H02G 3/32; B60R 16/0215; F16G 11/00; H01B 7/0045
(Continued)

(56) References Cited

U.S. PATENT DOCUMENTS

| 5,106,040 A | * | 4/1992 | Cafmeyer | ................. | H02G 3/26 |
| | | | | | 248/292.14 |
| 5,739,470 A | * | 4/1998 | Takeda | ................. | H02G 3/0487 |
| | | | | | 174/101 |

(Continued)

FOREIGN PATENT DOCUMENTS

| JP | 2007282352 A | 10/2007 |
| JP | 4034368 B2 | 11/2007 |
| JP | 2018101600 A | 6/2018 |

OTHER PUBLICATIONS

Non-Final Office Action dated Jan. 24, 2020, issued in U.S. Appl. No. 16/598,451.

*Primary Examiner* — Sherman Ng
(74) *Attorney, Agent, or Firm* — McClure, Qualey & Rodack, LLP

(57) ABSTRACT

Provided is a binding structure of a wire routing material which can allow reduction of cost and also provides excellent workability for assembly into a vehicle body when wiring for wire routing materials having different shapes, such as a wire harness and a flat wire routing material, is performed in the vehicle body. A binding structure 1 is formed in which a flexible wire routing material 2 and a plate-shaped flat wire routing material 3 having higher rigidity than the flexible wire routing material 2 overlap each other, and the flexible wire routing material 2 and the flat wire routing material 3 are enclosed in an annular form, bound, and held by a binding portion 45 of an engaging member 4 including an engaging portion 40 for assembly into the vehicle body.

7 Claims, 10 Drawing Sheets

(51) Int. Cl.
*F16G 11/00* (2006.01)
*H01B 7/00* (2006.01)

(58) Field of Classification Search
USPC .................................................... 174/72 A
See application file for complete search history.

(56) References Cited

U.S. PATENT DOCUMENTS

| | | | |
|---|---|---|---|
| 6,390,841 B1 | 5/2002 | Zaguskin | |
| 8,157,222 B1* | 4/2012 | Shirey | H02G 3/32 |
| | | | 248/68.1 |
| 2002/0129961 A1* | 9/2002 | Baker | B60R 16/0215 |
| | | | 174/72 A |
| 2004/0144899 A1 | 7/2004 | Rosemann et al. | |
| 2011/0272547 A1 | 11/2011 | Gotou et al. | |
| 2015/0107895 A1* | 4/2015 | Inao | B60R 16/0215 |
| | | | 174/72 A |

\* cited by examiner

BINDING STRUCTURE OF WIRE ROUTING MATERIAL

RELATED APPLICATIONS

This application claims the priority of Japanese Patent Application No. 2018-195427 filed on Oct. 16, 2018. The disclosure of the prior application is hereby incorporated herein in the entirety by reference.

BACKGROUND OF THE INVENTION

Field of the Invention

This invention relates to a binding structure of a wire routing material.

Description of Related Art

For vehicles, a clamp described in, for example, Japanese Laid-Open Patent Publication No. 2007-282352 is used to hold a wire harness formed by a wiring group including a signal line and a power supply line, in a binding state, in a vehicle body.

In recent years, a wire harness constituting a signal line and a flat wire routing material constituting a power supply line may be separately prepared, and wired in the vehicle body.

However, in order to perform wiring for different kinds of wire routing materials that include a wire harness and a flat wire routing material, in the vehicle body, it is considered that a guide member that includes two recessed storage portions extending in an elongated manner is used. Specifically, as shown in FIG. 10, a method in which a wire harness 1002 and a flat wire routing material 1003 are arranged separately in two recesses 1001 of a guide member 1000, and the wire harness 1002 and the flat wire routing material 1003 are bound together with the guide member 1000 by using a belt member 1004 to fix the guide member 1000 to the vehicle body, is considered. In this case, cost is increased due to the large size of the guide member 1000, and the assembly into the vehicle body becomes difficult because the large component needs to be assembled into the vehicle body.

An object of this invention is to achieve a binding structure of a wire routing material which can allow reduction of cost and also provides excellent workability for assembly into a vehicle body when wiring for wire routing materials having different shapes, such as a wire harness and a flat wire routing material, is performed in the vehicle body.

SUMMARY OF THE INVENTION

In order to attain the aforementioned object, a binding structure of a wire routing material includes:

a flexible wire routing material;

a plate-shaped flat wire routing material; and an engaging member including an engaging portion for assembly into a vehicle body, and a binding portion for binding the flexible wire routing material and the flat wire routing material.

According to the above invention, when the flexible wire routing material and the flat wire routing material which overlap each other are enclosed in an annular form by the binding portion of the engaging member, a binding and holding state can be easily achieved. At this time, when the flat wire routing material is a wire routing material having higher rigidity than the flexible wire routing material, it is advantageous in that the flat wire routing material having the higher rigidity acts as a support, and both the flexible wire routing material and the flat wire routing material can be stably bound even if the flexible wire routing material which tends to be deformed is present. Unlike a guide member extending along the wiring direction of the wire routing materials as in a conventional art, the binding portion may be caused to simply enclose the flexible wire routing material and the flat wire routing material in a very short-interval region in the longitudinal direction of the wire routing materials, and, therefore, the engaging member can be made small. Since the small engaging member includes an engaging portion, the engaging portion facilitates assembly into a vehicle body.

The engaging portion according to this invention may be formed so as to protrude from the flat wire routing material side, not from the flexible wire routing material side, in a binding state in which the flexible wire routing material and the flat wire routing material are bound by the binding portion. In this case, the engaging portion for assembly into the vehicle body is disposed on the side of the flat wire routing material having higher rigidity, and, therefore, the engaging portion becomes stable without becoming unsteady during assembly into the vehicle body, thereby facilitating the assembly. For example, the engaging member according to this invention includes a placement portion on which the flat wire routing material is placed such that the placement portion faces the main back surface of the flat wire routing material, and the engaging portion can be formed so as to protrude from a surface, on a side opposite to the flat wire routing material side, of the wall portion opposing the flat wire routing material in the placement portion.

The engaging member according to this invention may be provided with a placement portion having a mount surface on which the flat wire routing material is placed, and the engaging portion may be formed so as to protrude from a back surface, of the placement portion, which is opposite to the mount surface, or from a side surface located lateral to the flat wire routing material mounted on the placement portion. In this case, the placement portion may be provided with a bottom wall portion having a mount surface on which the flat wire routing material is placed, and a side wall portion extending upward from the bottom wall portion on both lateral sides or one of the lateral sides lateral to the flat wire routing material, and the engaging portion may be formed so as to protrude from one of the bottom wall portion and the side wall portion. With these configurations, the engaging portion can be formed so as to assuredly avoid interference with the wire routing material.

The engaging member according to this invention may be provided with a placement portion having a mount surface on which the flat wire routing material is placed, and the placement portion may have a plate-like shape, and a plate width may be larger than a width of the flat wire routing material. With this configuration, even if the flat wire routing material is a flexible thin flat cable or the like, the plate-shaped placement portion can support the flat cable, so that the flat cable can be stably bound and held without being deformed.

The engaging member according to this invention may be provided with a placement portion including a bottom wall portion having a mount surface on which the flat wire routing material is placed, and side wall portions extending upward from the bottom wall portion on both lateral sides lateral to the flat wire routing material, and an opposing width between the side wall portions may be larger than a width of the flat wire routing material in an opposing direction. The flat wire routing material is less flexible than the flexible wire routing material, and, therefore, may be slightly displaced from a fixing hole of the vehicle body during assembly into the vehicle body in a state in which the wire routing materials are bound by the engaging member, so that insertion into and engagement with the fixing hole may be impossible. However, in the configuration of this invention, the flat wire routing material can be moved in the opposing direction in which both side wall portions oppose each other. Accordingly, even if the position of the flat wire routing material relative to the fixing hole is displaced, such a displacement can be absorbed by displacing the flat wire routing material in the opposing direction in which the both side wall portions oppose each other.

The engaging member according to this invention may be provided with a placement portion having a mount surface on which the flat wire routing material is placed, and the binding portion may be formed integrally with or separately from the placement portion so as to bind the flat wire routing material and the flexible wire routing material such that the flexible wire routing material that overlaps over the flat wire routing material mounted on the placement portion is pressed toward the mount surface. When the thickness (opposing width between the main front surface and the main back surface located on the back thereof) of the flat wire routing material is small, the flat wire routing material may be deformed due to the small thickness. However, the flat wire routing material is placed such that the main back surface faces the bottom wall portion, and the main front surface is pressed toward the bottom wall portion by the flexible wire routing material, so that the flat wire routing material can be stably placed without deformation. In this case, the engaging portion is formed so as to protrude from one of the bottom wall portion and the side wall portion, whereby the engaging portion becomes sable without becoming unsteady during assembly into the vehicle body, thereby facilitating the assembly.

DESCRIPTION OF THE PREFERRED EMBODIMENTS

Hereinafter, a first embodiment of this invention will be described with reference to the drawings.

Figure 1:
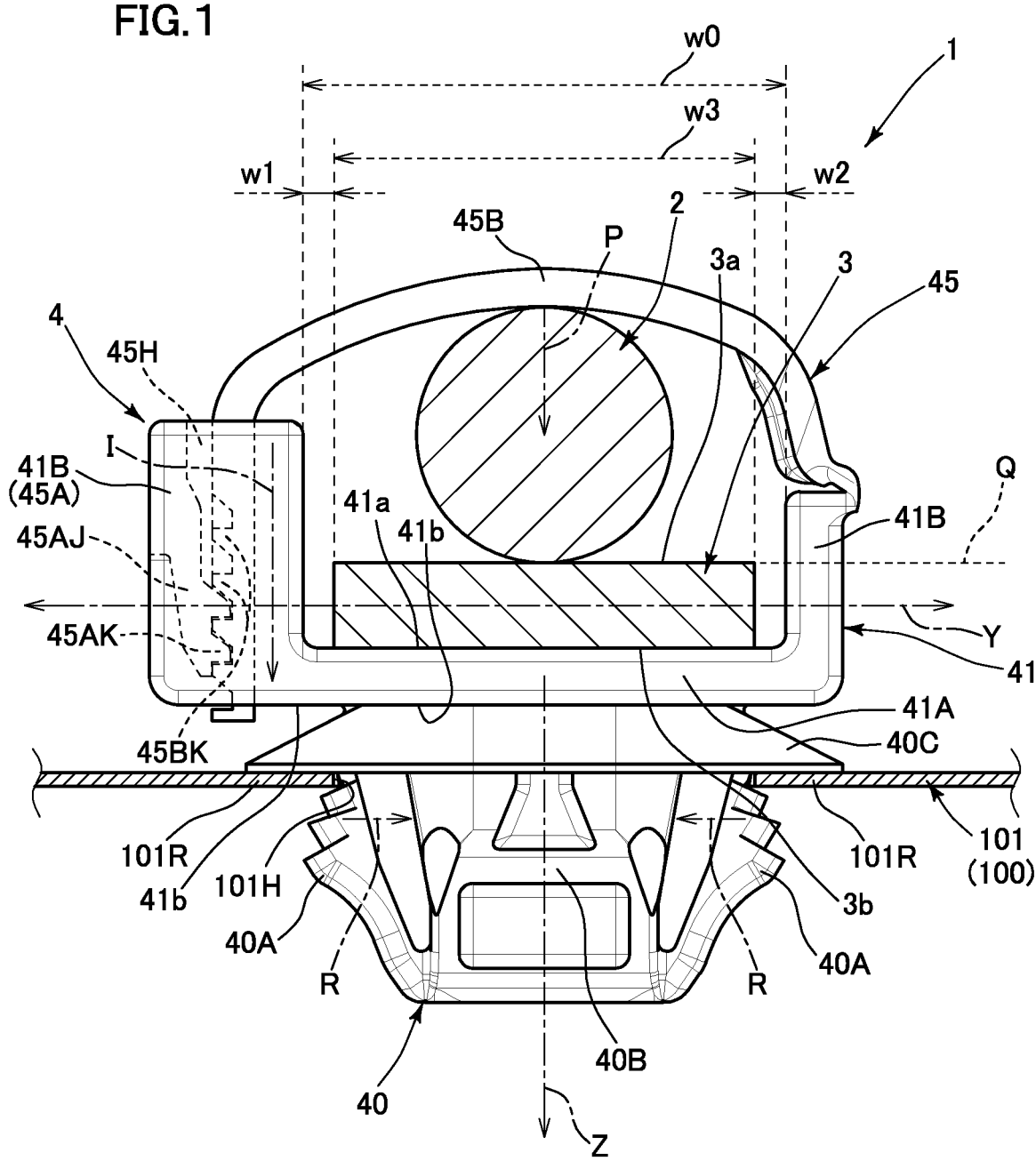
FIG. 1 is a front view showing a binding structure of a wire routing material, according to a first embodiment of this invention, in a state of being assembled into a vehicle body.

In the first embodiment, as shown in FIG. 1, a wire routing material binding structure 1 is formed so as to include a flexible wire routing material 2 constituting a first wire routing material, a plate-shaped flat wire routing material 3 constituting a second wire routing material and having higher rigidity than the flexible wire routing material 2, and an engaging member 4 that binds these wire routing materials and includes an engaging portion 40 for assembly into a fixing hole 101H of a predetermined fixing portion 101 of a vehicle body 100.

The flexible wire routing material 2 is a flexible member formed by a bundle of a plurality of wires extending in an elongated manner. The flexible wire routing material 2 is a wire harness that forms a signal line. The flexible wire routing material 2 of this invention is not limited to a wire harness.

Figure 9:
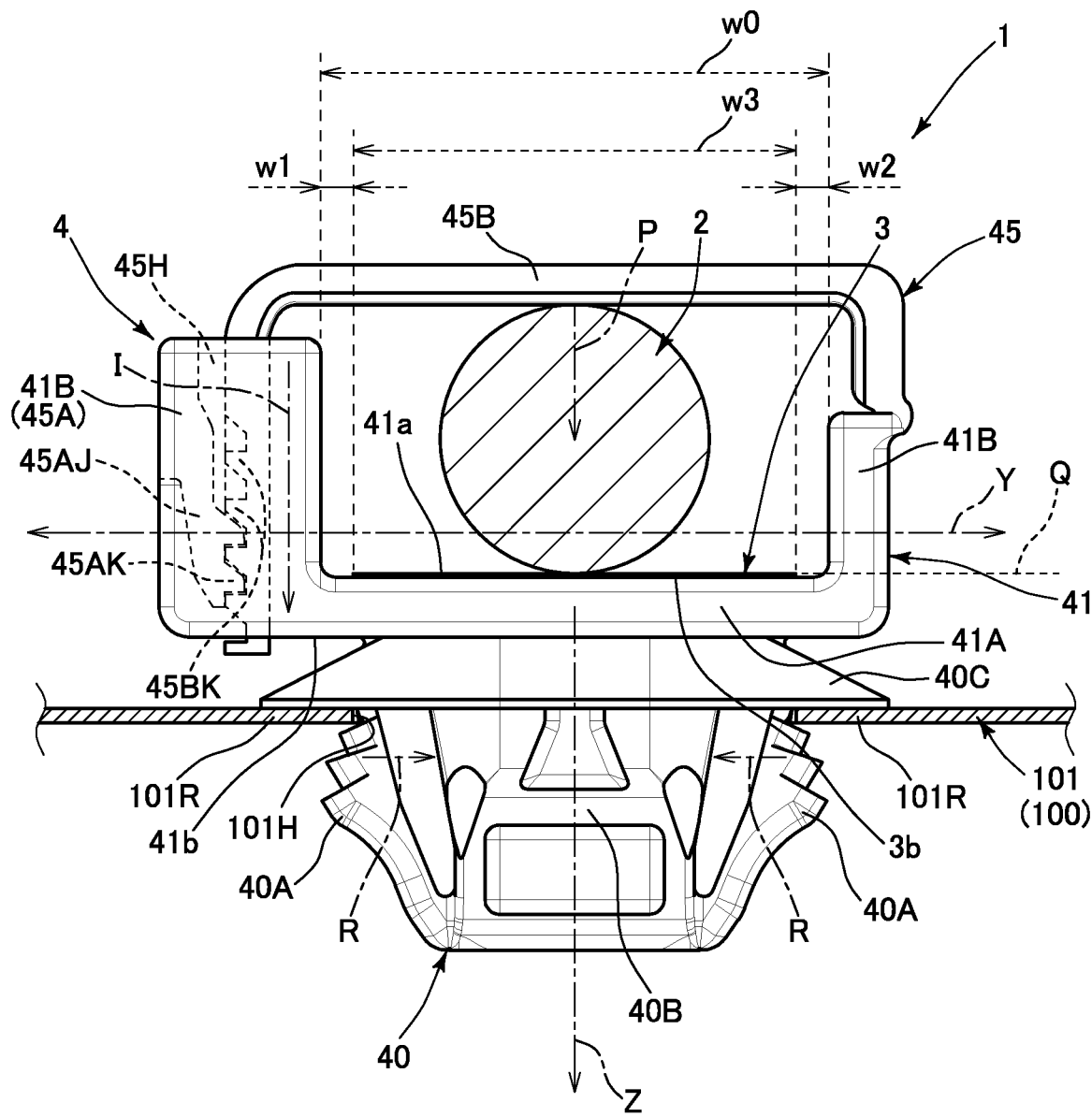
FIG. 9 shows a second modification of the first embodiment shown in FIG. 1 in a front view.
Figure 10:
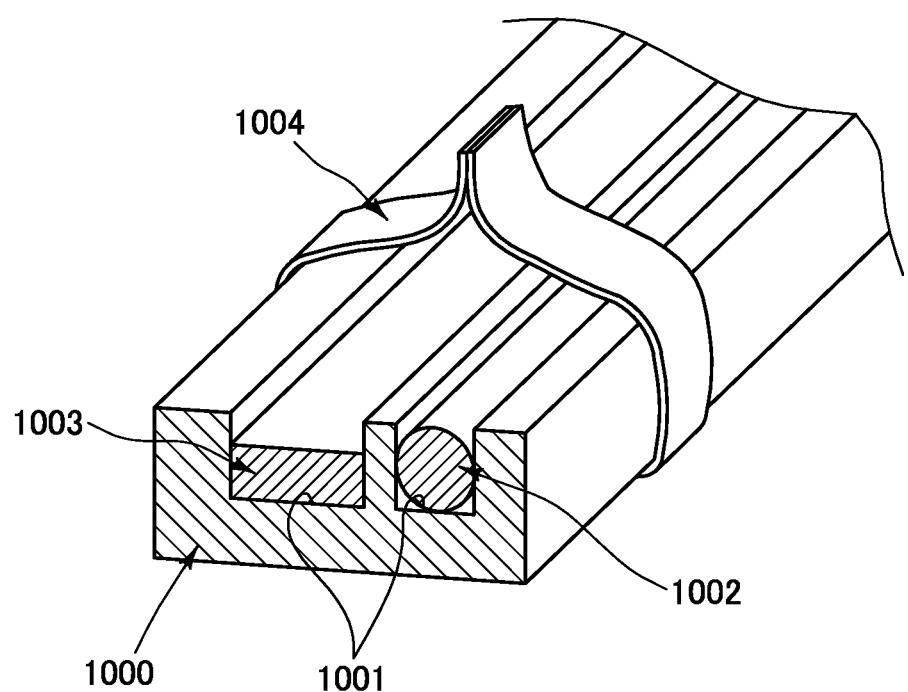
FIG. 10 is a cross-sectional view showing a conventional binding structure of different kinds of wire routing materials.

The flat wire routing material 3 is a member that has a flat-plate-like shape, extends in an elongated manner, and has higher rigidity and lower flexibility than the flexible wire routing material 2. The flat wire routing material 3 is a metal bus bar that forms a power supply line. The flat wire routing material 3 is formed such that four surfaces forming the outer peripheral surfaces are each formed as a flat surface extending in the longitudinal direction of the flat wire routing material 3. The main surfaces of the flat wire routing material 3 refer to front and back surfaces 3a, 3b (main front surface 3a and main back surface 3b) that have the largest area among the four outer peripheral surfaces. The flat wire routing material 3 of this invention may be an FFC (Flexible Flat Cable) that constitutes a flat cable as shown in FIG. 9 or an FPC (Flexible Printed Circuit), and is not limited to a bus bar.

Figure 2:
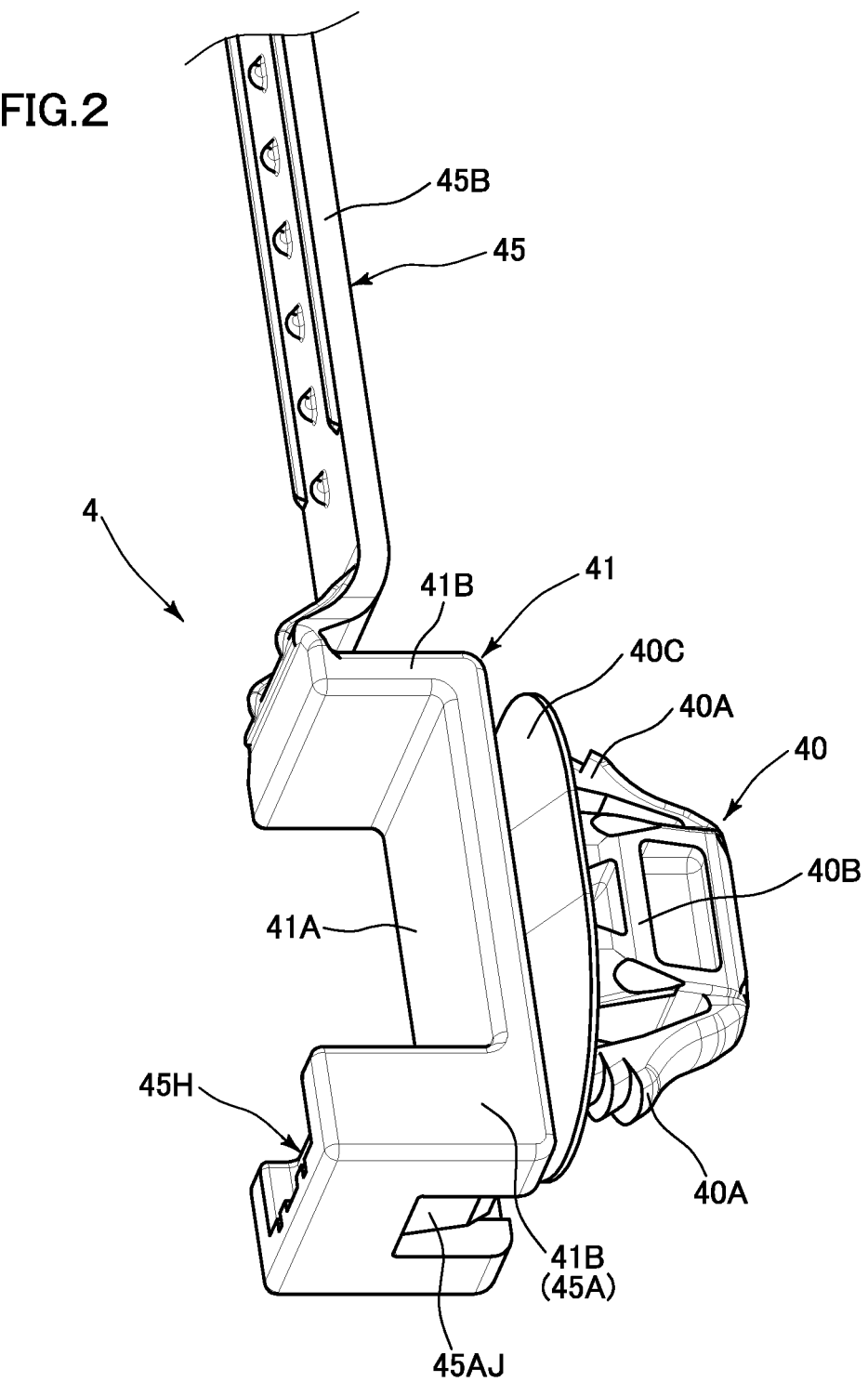
FIG. 2 is a perspective view of an engaging member shown in FIG. 1.

As shown in FIGS. 1 and 2, the engaging member 4 includes the engaging portion 40 for assembly into the vehicle body 100.

The engaging portion 40 is an anchor portion that is inserted into a predetermined fixing hole 101H of a fixing portion 101 provided in the vehicle body 100, whereby the engaging portion 40 is engaged with and assembled into the fixing hole 101H so as to come into a locking state. The engaging portion 40 includes a column portion 40B that is inserted into the fixing hole 101H, an elastic locking piece 40A that is inserted into the fixing hole 101H together with the column portion 40B and is engaged, after being inserted, with a peripheral part 101R around the fixing hole 101H so as to come into a locking state, and a contact portion 40C that holds the peripheral part 101R around the fixing hole 101H between the elastic locking piece 40A and the contact portion 40C in the locking state.

The elastic locking piece 40A has a shape that expands from the distal end side (lower side in FIG. 1) of the column portion 40B so as to be away from the column portion 40B toward the proximal end side (upper side in FIG. 1), and the proximal end side portion is elastically deformable so as to approach the column portion 40B. When inserted into the fixing hole 101H in a predetermined insertion direction Z, the elastic locking piece 40A is pushed inward into the hole (arrow R side) by the peripheral part 101R around the fixing hole 101H, and is elastically deformed so as to approach the column portion 40B. However, when inserted into a predetermined position, the elastic locking piece 40A is locked relative to the peripheral part 101R around the fixing hole 101H from the far side (lower side in FIG. 1) in the insertion direction Z, and comes into a locking state in which the elastic locking piece 40A is inhibited from being detached in a direction opposite to the insertion direction Z. In the above-described locking state, the contact portion 40C comes into contact with the peripheral part 101R around the fixing hole 101H from the near side (upper side in FIG. 1) in the insertion direction Z, and holds the peripheral part 101R between the elastic locking piece 40A and the contact portion 40C. Consequently, the engaging portion 40 is assembled into the fixing hole 101H so as to come into the locking state.

The contact portion 40C has a shape extending in a dish-like form from the proximal end side of the column portion 40B in the insertion direction Z, and comes into contact with the peripheral part 101R around the fixing hole 101H so as to form an annular shape. The contact portion 40C also functions to prevent a foreign object (dust, etc.) from entering from the far side (lower side in FIG. 1) in the insertion direction Z of the fixing hole 101H to the near side (upper side in FIG. 1) through the fixing hole 101H.

As shown in FIGS. 1 and 2, the engaging member 4 includes a placement portion 41 for placing the flat wire routing material 3, and a binding portion 45 that binds and holds the flat wire routing material 3 placed on the placement portion 41 and the flexible wire routing material 2. The engaging member 4 includes the engaging portion 40, the placement portion 41, and the binding portion 45, which are integrated with each other. The flexible wire routing material 2 and the flat wire routing material 3 are placed on the placement portion 41 so as to overlap each other, and the flexible wire routing material 2 and the flat wire routing material 3 are pressed toward the placement portion 41 to be bound and held by the binding portion 45, thereby forming the binding structure 1.

The placement portion 41 includes a bottom wall portion 41A on which the flat wire routing material 3 is placed such that the main back surface 3b faces the bottom wall portion 41A, and side wall portions 41B, 41B extending upward from the bottom wall portion 41A on both lateral sides lateral to the flat wire routing material 3. The placement portion 41 forms a substantially U-shape (C-shape) in which the opposing portion between the end sides (upper side in FIG. 1) of the side wall portions 41B, 41B is open.

The binding portion 45 is placed so as to cover the open side (upper side in FIG. 1: the storage opening side of the placement portion 41) of the placement portion 41, and binds and holds the flexible wire routing material 2 and the flat wire routing material 3 so as to press the flexible wire routing material 2 and the flat wire routing material 3 toward a mount surface 41a. The binding portion 45 is formed integrally with the placement portion 41, and is placed so as to overlap the flexible wire routing material 2 placed, in an overlapping manner, on the main front surface 3a of the flat wire routing material 3 which is placed on the bottom wall portion 41A of the placement portion 41, and binds and holds the flat wire routing material 3 and the flexible wire routing materials 2 so as to press the flat wire routing material 3 and the flexible wire routing material s 2 toward the bottom wall portion 41A (arrow P side).

The binding portion 45 includes a flexible belt portion 45B that extends from one of the side wall portions 41B, 41B, and a buckle portion 45A as a locking portion that is provided at the other of the side wall portions 41B, 41B and locks the belt portion 45B so as to bring the belt portion 45B into a locking state. The buckle portion 45A is formed as the other of the side wall portions 41B, 41B and includes a locking hole portion 45H that is open upward, and the belt portion 45B is inserted into the locking hole portion 45H from the end side thereof.

Specifically, the belt portion 45B is provided with a plurality of locking pawl portions 45BK along the longitudinal direction thereof. On the other hand, the locking hole portion 45H is internally provided with locking engagement portions 45AK that are locked relative to the locking pawl portions 45BK such that the inserted belt portion 45B is not detached in a direction opposite to the insertion direction Z. When the belt portion 45B is inserted into the locking hole portion 45H, the locking pawl portions 45BK elastically deform an elastic piece 45AJ provided with the locking engagement portions 45AK so as to push the elastic piece 45AJ outward (left side in FIG. 1). Then, the locking pawl portions 45BK are locked, in a direction opposite to an insertion direction I, relative to the locking engagement portions 45AK of the elastic piece 45AJ that is elastically restored through the locking engagement portions 45AK, whereby the locking pawl portions 45BK are prevented from being detached. The belt portion 45B can more firmly bind and hold the flat wire routing material 3 and the flexible wire routing material 2 when the locking pawl portions 45BK located closer to the proximal end side are engaged with and locked by the locking engagement portions 45AK.

The belt portion 45B is thinner than the bottom wall portion 41A and extends in an elongated manner (see FIG. 2), and its end side portion that protrudes beyond the buckle portion 45A is cut after the belt portion 45B has been locked relative to the buckle portion 45A (see FIG. 1).

The binding portion 45 functions, together with the placement portion 41, as a wire routing material attaching portion for attaching wire routing materials such as the flexible wire routing material 2 and the flat wire routing material 3 to the engaging member 4.

The engaging portion 40 of the engaging member 4 is formed so as to protrude on the flat wire routing material 3 side (region below the broken line Q in FIG. 1), not on the flexible wire routing material 2 side, in a state in which the flexible wire routing material 2 and the flat wire routing material 3 are bound to and held on the engaging member 4 by the binding portion 45. The engaging portion 40 is formed so as to protrude from the bottom wall portion 41A. Specifically, the engaging portion 40 is formed on a back surface 41b at the back of the mount surface 41a of the bottom wall portion 41A in a state in which the flexible wire routing material 2 and the flat wire routing material 3 are bound to and held on the engaging member 4, and the column portion 40B is formed so as to protrude from the back surface 41b.

The side wall portions 41B, 41B are opposing wall portions extending upward from the bottom wall portion 41A on both sides lateral to the flat wire routing material 3 mounted on the bottom wall portion 41A. In an opposing direction Y, an opposing width w0 between the side wall portions 41B, 41B is larger than a width w3 of the flat wire routing material 3 mounted on the bottom wall portion 41A. The side wall portions 41B, 41B form gaps having widths w1, w2 between the flat wire routing material 3 and the side wall portions 41B, 41B. This allows the flat wire routing material 3 to be movable (slidable) in the opposing direction Y. Accordingly, when the engaging member 4 and the flat wire routing material 3 are to be slightly moved relative to each other in the direction Y during assembly into the vehicle body 100, the relative movement can be performed by using the gaps.

Although one embodiment of this invention has been described above, this embodiment is merely illustrative. This invention is not limited thereto, and various modifications such as additions and omissions may be made on the basis of the knowledge of a person skilled in the art without departing from the scope of the claims.

Hereinafter, other embodiments different from the above embodiment, and modifications thereof, will be described. Parts having the same functions as those in the above embodiment are denoted by the same reference characters, and the detailed description thereof is omitted. The above embodiment and the following modifications and other embodiments may be combined to be implemented as appropriate as long as no technical contradiction arises.

Although the binding portion 45 of the above embodiment includes the belt portion 45B and the buckle portion 45A that are integrated with the placement portion 41 of the engaging member 4, the binding portion 45 may be provided separately from the placement portion 41 and the engaging portion 40. However, in a state in which the binding portion 45 binds and holds the flexible wire routing material 2 and the flat wire routing material 3, the binding portion 45 needs to be integrated with the engaging member 4 including the engaging portion 40.

A second embodiment of this invention will be described with reference to FIG. 3.

Figure 3:
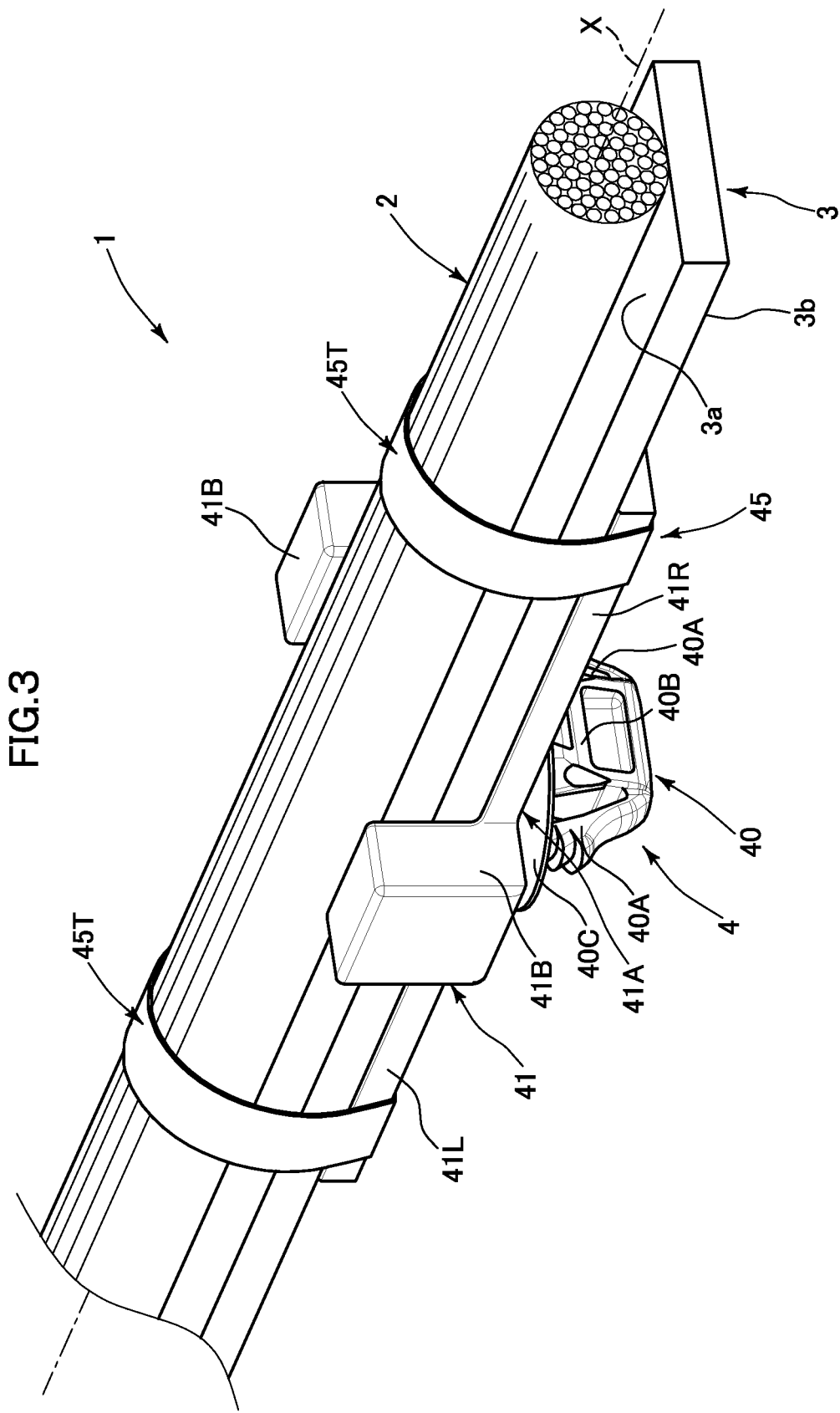
FIG. 3 is a perspective view showing a binding structure of a wire routing material according to a second embodiment of this invention.

In a binding structure 1 of a wire routing material according to the second embodiment, tape members 45T that are separate from the engaging portion 40 and the placement portion 41 are used as the binding portion 45 as shown in FIG. 3. In this case, the tape members 45T are adhered to and wound around the outer circumferences of the placement portion 41, the flat wire routing material 3, and the flexible wire routing material 2 which overlap each other in order, respectively. Specifically, the bottom wall portion 41A of the placement portion 41 includes sleeve portions 41L, 41R (also referred to as bottom wall extension portions) extending on both sides in a longitudinal direction X of the flat wire routing material 3 placed on the bottom wall portion 41A and the flexible wire routing material 2, and the flat wire routing material 3 is also placed on the sleeve portions 41L, 41R. Although both the side wall portions 41B, 41B are not formed in a region in which the sleeve portions 41L, 41R are formed, the side wall portions 41B, 41B may be formed in an extended manner. The tape members 45T are wound around and adhered to the outer circumferences of the sleeve portions 41L, 41R, the flat wire routing material 3, and the flexible wire routing material 2 which overlap each other in order, respectively. Thus, the flat wire routing material 3 and the flexible wire routing material 2 are bound and held and the flat wire routing material 3, the flexible wire routing material 2, and the engaging member 4 are integrated with each other.

The binding portion 45 shown in FIG. 3 includes the tape members 45T that are separate from the engaging member 4, and the sleeve portions 41L, 41R of the engaging member 4. Furthermore, the sleeve portions 41L, 41R are formed across the engaging portion 40 on both a first side in the longitudinal direction X and a second side opposite to the first side, and the binding and holding are performed on both of these sides by the tape members 45T. The engaging member 4 includes, together with the engaging portion 40, the binding portion 45 including the tape members 45T.

A third embodiment of this invention will be described with reference to FIGS. 4 and 5.

Figure 4:
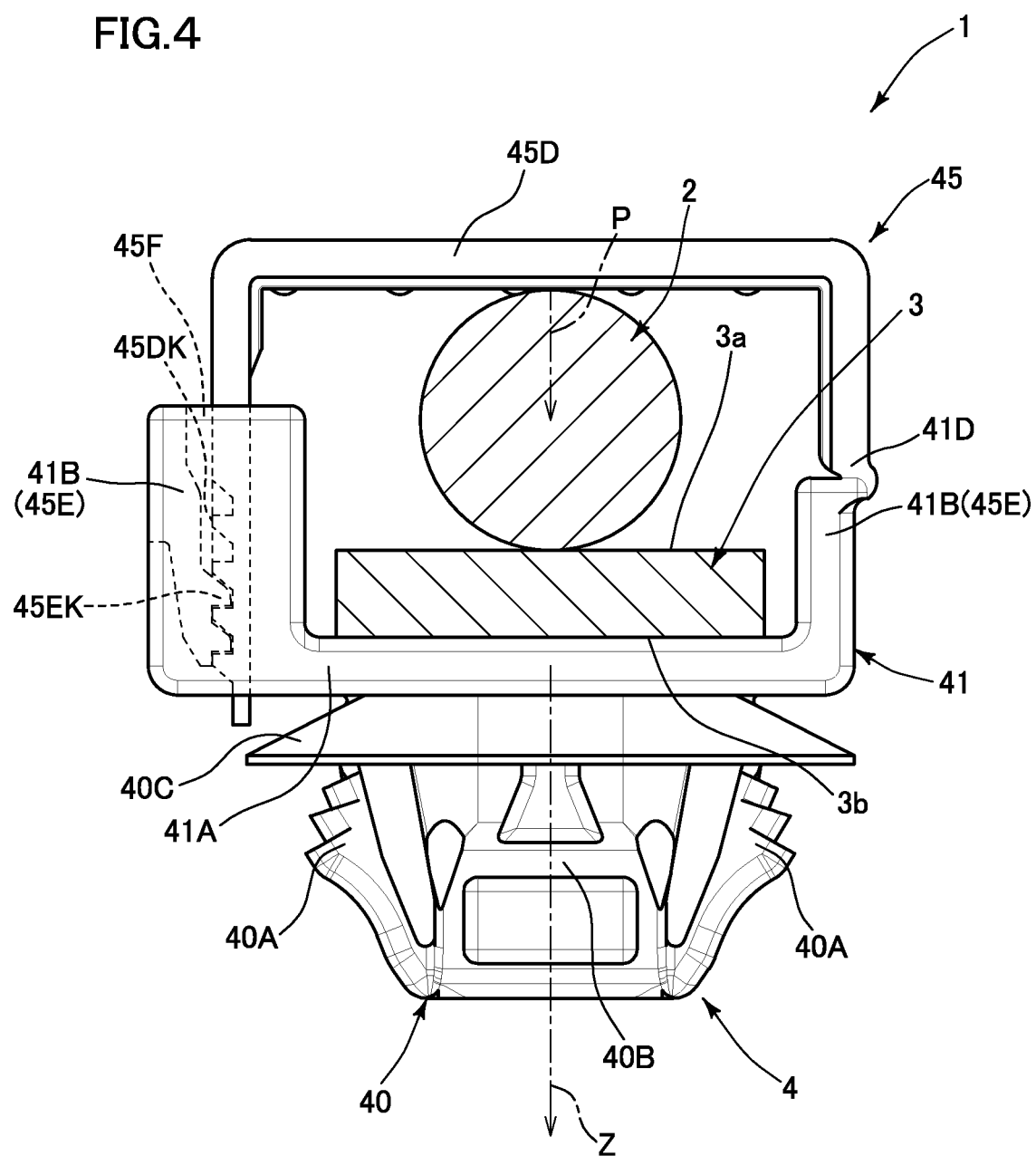
FIG. 4 is a side view showing a binding structure of a wire routing material according to a third embodiment of this invention.
Figure 5:
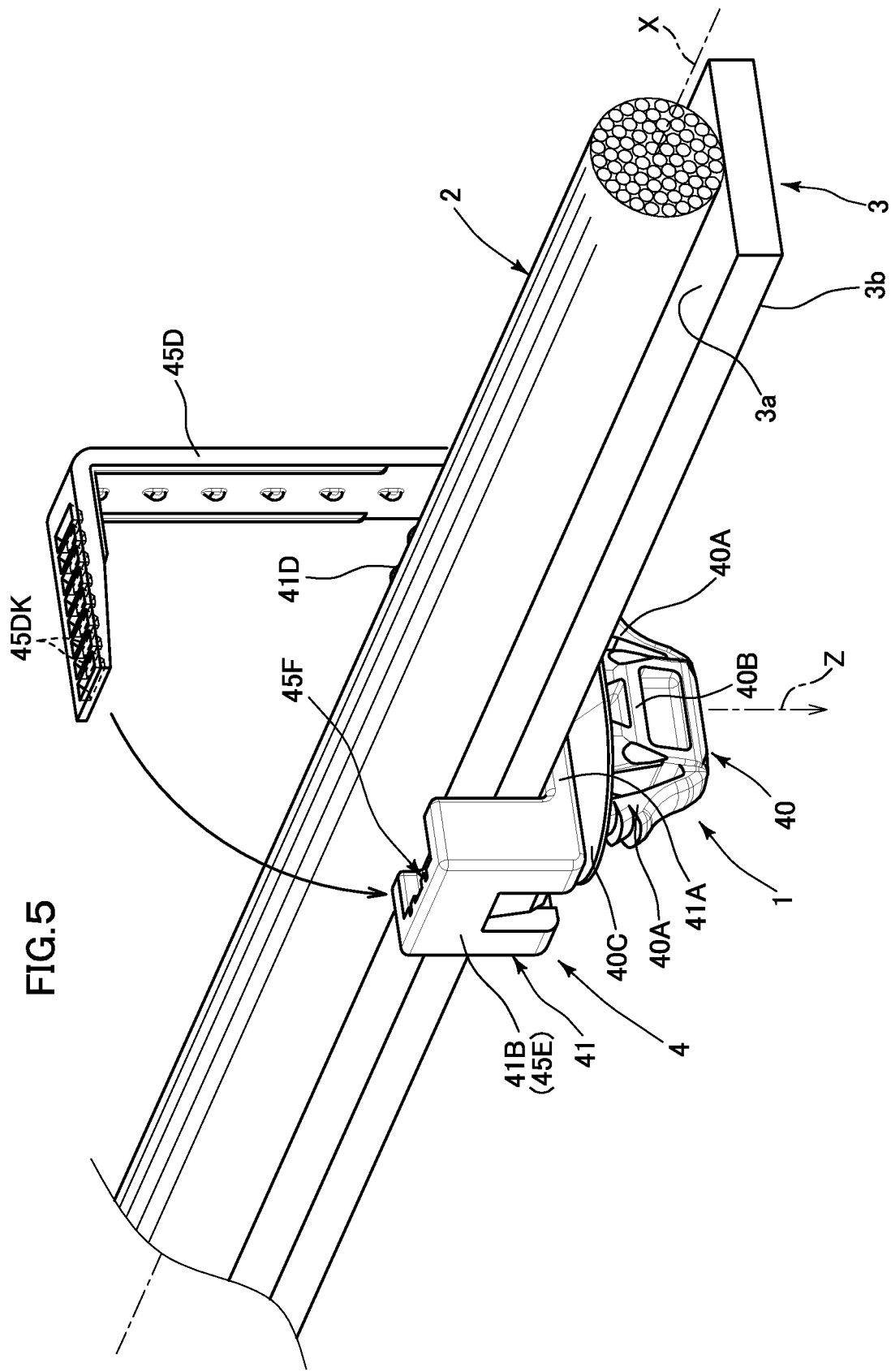
FIG. 5 is a perspective view showing a state before the binding state shown in FIG. 4.

In a binding structure 1 of a wire routing material according to the third embodiment, a clamp portion 45D that is bent by using a hinge portion 41D (see FIG. 4) as a fulcrum is used as the binding portion 45 as shown in FIGS. 4 and 5. In this case, the clamp portion 45D is connected to one of the side wall portions 41B, 41B via the hinge portion 41D. Then, the clamp portion 45D can be bent so as to shift between an open state (see FIG. 5) in which the opposing portion formed between the other of the side wall portions 41B, 41B and the clamp portion 45D is open so as to allow passage of the flat wire routing material 3 and the flexible wire routing material 2, and a locking state (see FIG. 4) in which the clamp portion 45D bends toward the other of the side wall portions 41B, 41B and is locked and fixed. In the locking state (see FIG. 4), locking pawl portions 45DK on the end side of the clamp portion 45D are engaged with and fixed to the other of the side wall portions 41B, 41B which constitutes a clamp engaging portion 45E. The side wall portion 41B constituting the clamp engaging portion 45E includes a locking hole portion 45F that is open upward. When the end portion of the clamp portion 45D enters the locking hole portion 45F, the locking pawl portions 45DK at the end portion are engaged with locking engagement portions 45EK provided in the locking hole portion 45F so as to be prevented from being detached.

The binding portion 45 shown in FIGS. 4 and 5 includes the clamp portion 45D that is integrated with the engaging member 4, and the clamp engaging portion 45E (41B) that is also integrated with the engaging member 4. The engaging member 4 includes, together with the engaging portion 40, the binding portion 45 including the clamp portion 45D.

Hereinafter, modifications of the above-described embodiments will be described.

Figure 6:
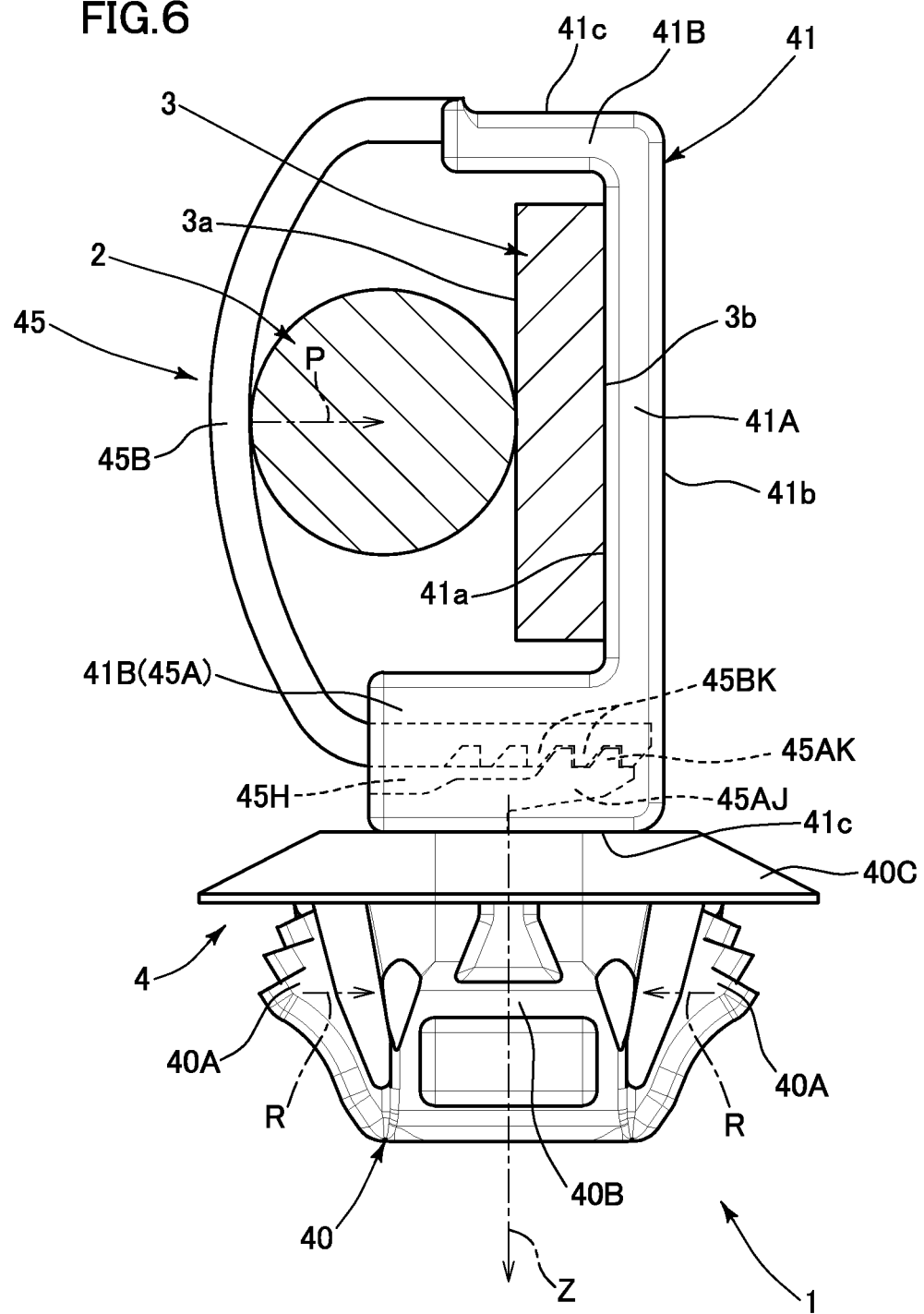
FIG. 6 is a front view of an engaging member according to a first modification of the first embodiment shown in FIG. 1.
Figure 7:
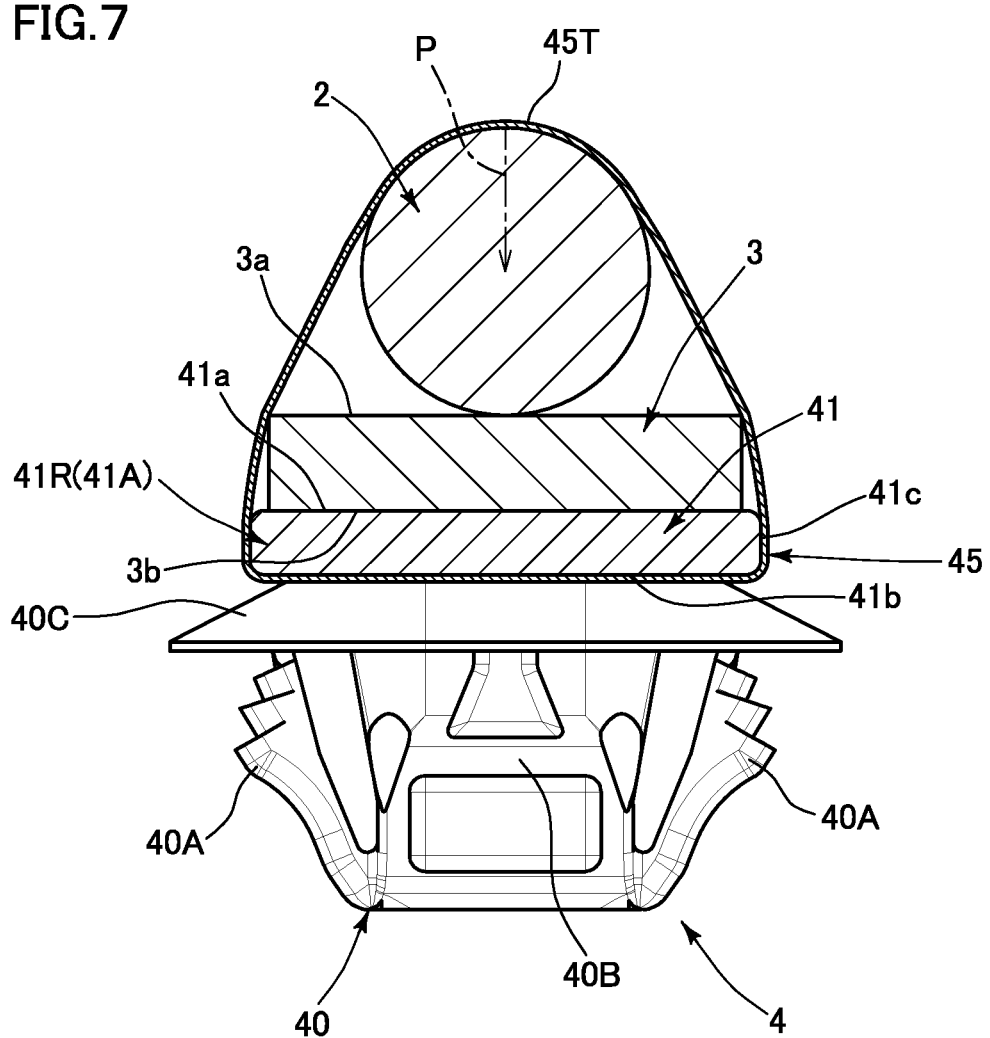
FIG. 7 shows a first modification of the second embodiment shown in FIG. 3 in a front view similar to FIG. 1.
Figure 8:
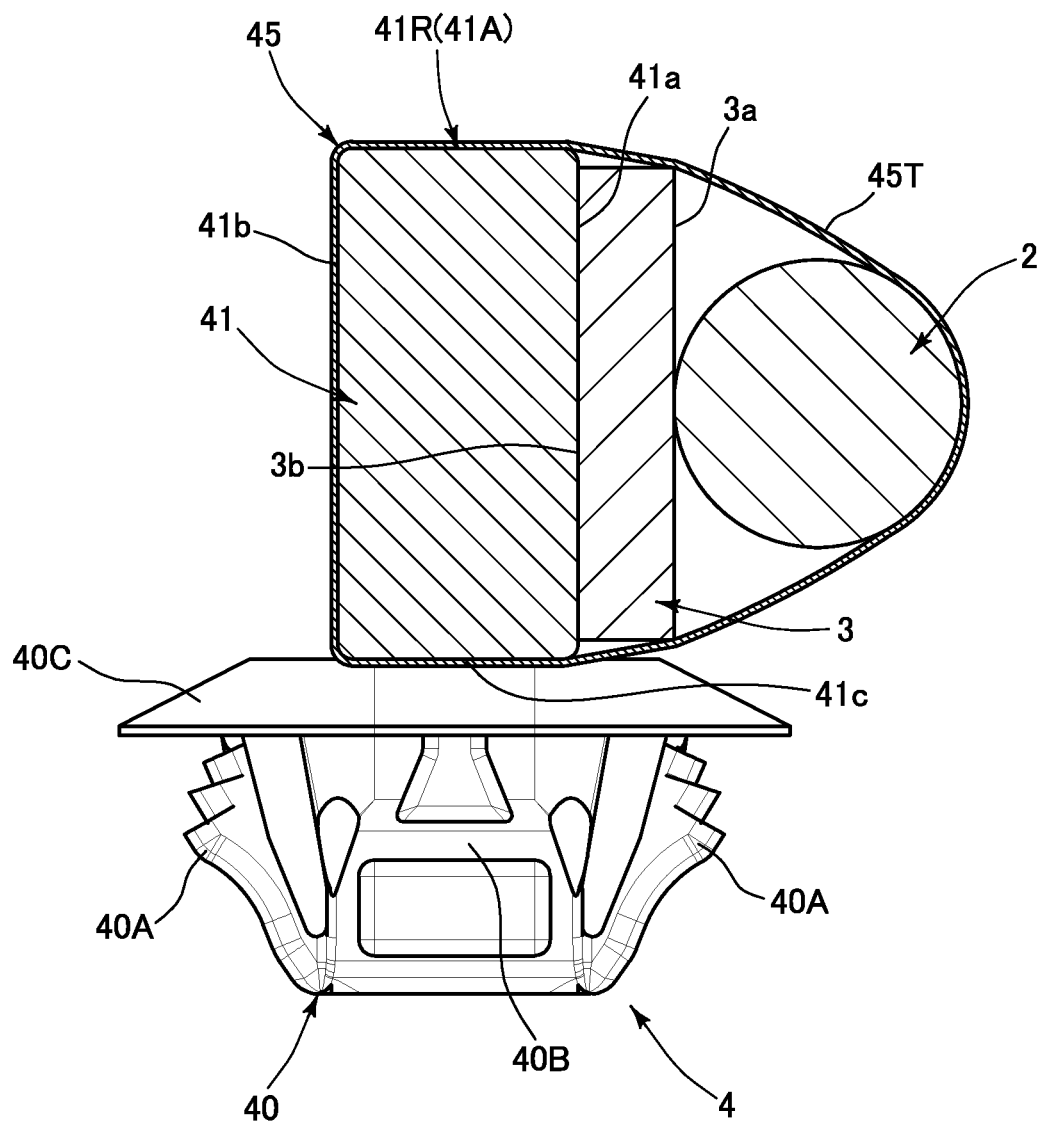
FIG. 8 shows a second modification of the second embodiment shown in FIG. 3 in a front view.

Unlike the first embodiment shown in FIG. 1, the engaging portion 40 can be formed so as to protrude from the back surface 41b, of the placement portion 41, on the side opposite to the mount surface 41a side, or from a side surface 41c located lateral to the flat wire routing material 3 mounted on the placement portion 41. For example, the engaging portion 40 may be formed on the side wall portion 41B, 41B as shown in FIG. 6. The engaging portion 40 shown in FIG. 6 is formed on the outer side surface (side surface 41c), of at least one of the side wall portions 41B, 41B, located opposite to the inner side surface that faces the flat wire routing material 3. In the case where the side wall portions 41B, 41B are not formed on the placement portion 41, the engaging portion 40 can be formed on a surface, of the bottom wall portion 41A, which is different from the mount surface 41a for the flat wire routing material 3, unlike the second embodiment shown in FIG. 3. Specifically, the engaging portion 40 may be formed so as to protrude from the back surface 41b, of the bottom wall portion 41A, located opposite to the mount surface 41a as shown in FIG. 7, or the engaging portion 40 may be formed so as to protrude from the side surface 41c (surface located lateral to the flat wire routing material 3) of the bottom wall portion 41A as shown in FIG. 8.

The placement portion 41 may include only one of the side wall portions 41B, 41B. Alternatively, as shown in FIGS. 7 and 8, only the bottom wall portion 41A may be formed without forming the side wall portions 41B. The placement portion 41 in the latter case has a plat-like shape including only the bottom wall portion 41A. Then, the plate width (left-right width in FIG. 7, up-down width in FIG. 8) of the plate-shaped placement portion 41 (bottom wall portion 41A) is larger than the width of the flat wire routing material 3. In the case where the flat wire routing material 3 is a flexible thin flat cable or the like, the plate-shaped placement portion 41 (bottom wall portion 41A) serves as a support plate, and the flat cable can be stably bound and held without being bent.

DESCRIPTION OF THE REFERENCE CHARACTERS 1 binding structure of wire routing material
2 flexible wire routing material
3 flat wire routing material
4 engaging member
40 engaging portion
41 placement portion
41A bottom wall portion
41B side wall portion
45 binding portion
45A buckle portion
45B belt portion
45T tape member
45D clamp portion
45F locking hole portion

What is claimed is:

1. A binding structure of a wire routing material, the binding structure comprising:
    a flexible wire routing material;
    a plate-shaped flat wire routing material; and
    an engaging member including an engaging portion for assembly into a vehicle body, and a binding portion for binding the flexible wire routing material and the flat wire routing material, wherein
    the engaging member is provided with a placement portion having a mount surface on which the flat wire routing material is placed, and
    the binding portion is formed integrally with or separately from the placement portion so as to bind the flat wire routing material and the flexible wire routing material such that the flexible wire routing material that overlaps over the flat wire routing material mounted on the placement portion is pressed toward the mount surface.

2. The binding structure of a wire routing material according to claim 1, wherein
    the flat wire routing material has higher rigidity than the flexible wire routing material.

3. The binding structure of a wire routing material according to claim 1, wherein
    the engaging portion protrudes from the flat wire routing material side, not from the flexible wire routing material side, in a binding state in which the flexible wire routing material and the flat wire routing material are bound by the binding portion.

4. The binding structure of a wire routing material according to claim 1, wherein
    the engaging member is provided with a placement portion having a mount surface on which the flat wire routing material is placed, and
    the engaging portion is formed so as to protrude from a back surface, of the placement portion, which is opposite to the mount surface, or from a side surface located lateral to the flat wire routing material mounted on the placement portion.

5. The binding structure of a wire routing material according to claim 4, wherein
    the placement portion is provided with a bottom wall portion having a mount surface on which the flat wire routing material is placed, and a side wall portion extending upward from the bottom wall portion on both lateral sides or one of the lateral sides lateral to the flat wire routing material, and
    the engaging portion is formed so as to protrude from one of the bottom wall portion and the side wall portion.

6. The binding structure of a wire routing material according to claim 1, wherein
    the engaging member is provided with a placement portion including a bottom wall portion having a mount surface on which the flat wire routing material is placed, and side wall portions extending upward from the bottom wall portion on both lateral sides lateral to the flat wire routing material, and
    an opposing width between the side wall portions is larger than a width of the flat wire routing material in an opposing direction.

7. The binding structure of a wire routing material according to claim 1, wherein
    the engaging member is provided with a placement portion having a mount surface on which the flat wire routing material is placed, and
    the placement portion has a plate-like shape, and a plate width is larger than a width of the flat wire routing material.

* * * * *